United States Patent [19]

Jin

[11] Patent Number: 5,315,873
[45] Date of Patent: May 31, 1994

[54] LIQUID LEVEL DETECTION APPARATUS AND METHOD THEREOF

[75] Inventor: Dong Z. Jin, Chiba, Japan

[73] Assignee: The Furukawa Electric Co., Ltd., Tokyo, Japan

[21] Appl. No.: 772,352

[22] PCT Filed: Feb. 28, 1990

[86] PCT No.: PCT/JP91/00270

§ 371 Date: Oct. 28, 1991

§ 102(e) Date: Oct. 28, 1991

[87] PCT Pub. No.: WO91/13324

PCT Pub. Date: Sep. 5, 1991

[30] Foreign Application Priority Data

| Feb. 28, 1990 | [JP] | Japan | 2-48344 |
| Mar. 7, 1990 | [JP] | Japan | 2-55778 |
| Mar. 27, 1990 | [JP] | Japan | 2-77216 |
| Mar. 27, 1990 | [JP] | Japan | 2-77217 |
| Mar. 27, 1990 | [JP] | Japan | 2-77218 |
| Mar. 30, 1990 | [JP] | Japan | 2-83462 |

[51] Int. Cl.⁵ .................................. G01F 23/00
[52] U.S. Cl. ...................................... 73/309
[58] Field of Search ............ 73/309, 451, 453, 454, 73/452

[56] References Cited

U.S. PATENT DOCUMENTS

| 2,416,570 | 2/1947 | Coleman . | |
| 2,550,031 | 4/1951 | Wraith, Jr. | 73/452 |
| 4,843,876 | 7/1989 | Holm | 73/309 |
| 4,981,042 | 1/1991 | Reeves | 73/454 |

FOREIGN PATENT DOCUMENTS

| 1207973 | 9/1959 | France . | |
| 2432349 | 2/1980 | France . | |
| 46123 | 3/1982 | Japan | 73/309 |
| 114131 | 5/1986 | Japan | 73/309 |
| 61-144131 | 5/1986 | Japan . | |
| 64-58603 | 3/1989 | Japan . | |
| 58603 | 3/1989 | Japan . | |
| 2043902 | 10/1980 | United Kingdom . | |

OTHER PUBLICATIONS

Supplementary European Search Report, Application No. EPC 91 90 5330.
Control and Instrumentation, vol. 15, No. 10, Oct. 1983, London, GB, pp. 51 and 53, "Effective Monitoring of Liquid Levels" by R. G. Fordham.
Patent Abstract of Japan, Publication No. JP60239629, Nov. 28, 1985.

Primary Examiner—William A. Cuchlinski, Jr.
Assistant Examiner—W. Morris Worth
Attorney, Agent, or Firm—Staas & Halsey

[57] ABSTRACT

Disclosed is a liquid level detection apparatus using the Archimedean principle suited for the measurement of the level of a liquid, in particular a high temperature molten metal. The liquid level detection apparatus is comprised of a probe (3) which inserted in a molten metal (2) and receives a buoyancy corresponding to the level of the liquid, an arm (4) which is supports the probe at one end, a support (7) which supports the arm, a force detector (8) which is provided under the other end of the arm and detects the buoyancy received by the probe through the arm, and a signal processing means (13) which performs operational processing on the electrical output signals of the force detector and finds the level corresponding to the output. In accordance with the Archimedean principle, if the specific gravity of the liquid is considered constant, them the change in the volume of the probe in the solution, that is, the change in the depth of entry, is proportional to the change in the buoyancy and, using this, the force is detected and operational processing performed to detect the liquid level.

44 Claims, 15 Drawing Sheets

F I G. 15
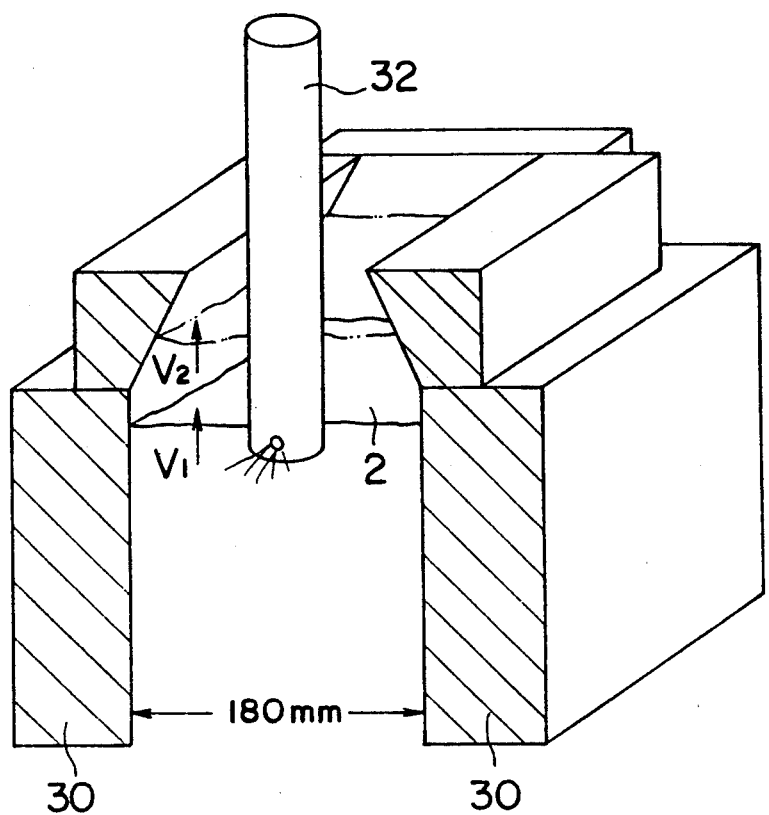
F I G. 16
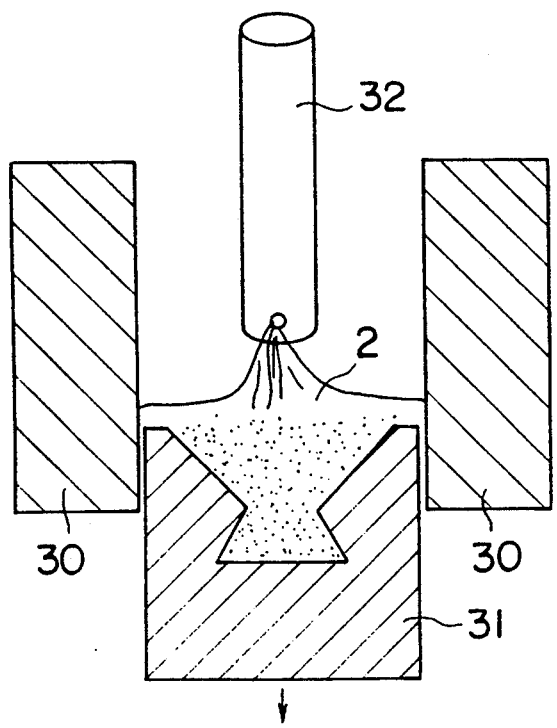

(LIST OF REFERENCES)

2 ··· liquid

3 ··· probe

4 ··· arm

7 ··· fulcrum

8 ··· force detector

13 ··· signal processor

15 ··· low pass filter

20 ··· compensator

21 ··· weight

45 ··· shield pipe

50 ··· magnetic bearing apparatus

LIQUID LEVEL DETECTION APPARATUS AND METHOD THEREOF

DESCRIPTION

1. Technical Field

The present invention relates to a liquid level detection apparatus for detecting the level of a liquid filled in a container, more particularly relates to a detection apparatus suited to the detection of the level of a high temperature molten metal filled in a pot, tundish, etc. of a melting furnace for metal.

2. Background Art

Molten metal is handled in the field of refining and melt casting of nonferrous metals. In particular, in the field of melt casting, advances are being made in the computer control of the continuous casting process for achieving greater efficiency of work. It is important for this that an accurate recognition be obtained of information of the continuous casting process as a whole. One means for obtaining a recognition of this information is to detect the level of the molten metal.

As a continuous sensor for detecting a liquid level, there have been known the sensors shown in FIG. 1 and FIG. 2.

The sensor of FIG. 1 is comprised of a detector A which is inserted into the molten metal and a signal processing circuit unit B. The detector A is comprised of a primary coil D1, a secondary coil D2, and a guide pipe C disposed so as to surround the two coils. The primary coil D1 and the secondary coil D2 are formed by an MI cable with a high heat resistance. The detector A is inserted into the molten metal E.

The signal processing circuit unit B supplies a high frequency current to the primary coil D1, detects the reverse electromotive force of the primary coil D1 generated by the high frequency current and the induced electromotive force occurring at the secondary coil D2, and mixes and outputs the two.

The induced electromotive force created by the primary coil D1 occurs also at the molten metal E around the guide pipe C. The deeper the depth of insertion of the detector A into the molten metal E, the greater the induced electromotive force generated at the molten metal E side and the smaller the induced electromotive force caused at the secondary coil D2. Therefore, the height of the level G of the molten metal E is detected by the magnitude of the output signal of the signal processing circuit B.

The sensor shown in FIG. 2 has a pair of coils F1 and F2 passes a high frequency current of 100 kHz to the primary coil F1, amplifies the induced electromotive force generated at the secondary coil F2, and outputs the realized results.

As the coils F1 and F2 approach the level G, the induces electromotive force occurring at the molten metal E increases, so the distance L between the bottom of the coils F1 and F2 and the level G is detected from the above-mentioned output so as to detect the level of the liquid.

In the liquid level sensor shown in FIG. 1, however, there are the following problems.

Accurate measurement requires the insertion of the detector A into the molten metal E to a depth of 200 to 500 mm. Therefore, when the amount of the molten metal E is reduced and the level G falls, accurate measurement becomes no longer possible.

The temperature of the molten metal E is extremely high, so the portions of the primary coil D1 and the secondary coil D2 inserted in the molten metal E rise in temperature and the inductance of the coils fluctuates widely. Therefore, complicated temperature compensation of the sensor becomes necessary.

Since the maximum temperature of use is about 800° C., the sensor cannot be used for copper, for example, where the temperature of the molten metal is approximately 1150° C., and thus the range of usage is limited.

Further, in the liquid level sensor shown in FIG. 2, there are the following problems.

The coils F1 and F2 do not come into contact with the molten metal E, but since the heat resistant temperature of the coils is a low 120° C., it is necessary to cool the coils. Therefore, a cooling apparatus becomes necessary, the liquid level detection apparatus becomes large in size, and costs rise. To solve this problem, there is the means of spreading chemicals such as boron on the surface of the molten metal E to suppress heat radiation from the molten metal E and prevent the rise in temperature of the coils F1 and F2, but such chemicals enter into the molten metal E as impurities and cause a reduction of the quality of the molten metal. Further, the troublesome work of spreading the chemicals becomes necessary.

The distance L between the coils F1 and F2 and the level G of the molten metal E can only be measured if in the range of 20 to 120 mm, so if the level of the molten metal E changes dramatically, accurate measurement becomes no longer possible.

There is a large temperature drift of the two coils F1 and F2.

In addition to the above-mentioned conventional liquid level detection sensor, there is known, for example, a liquid level detection apparatus for a liquid other than molten metal as disclosed in Japanese Unexamined Published Patent Application No. 1 (1989)-58603. In this liquid level detection apparatus, a float is made to float in a solution, a vertically movable rod is connected to the top of the float, the rod is supported by a bearing and made to stand up, the top end of the rod is brought into contact with a pressure sensor, and the buoyancy applied to the float is measured by the pressure sensor, thereby detecting the liquid level.

In this conventional apparatus, however, there was the problem that the level of molten metal could not be detected. Further, in this apparatus, since the weight of the float and rod were applied to the pressure sensor in addition to the buoyancy received by the float, the range of the pressure sensor had to be made larger and the resolution was reduced. Also, there was the problem that due to the frictional force received by the rod from the bearing etc., part of the buoyancy was cancelled out and the buoyancy could not be accurately detected by the pressure sensor, increasing the measurement error.

Disclosure of Invention

The present invention has as its first object the provision of a simple liquid level detection apparatus which has a high precision of detection and a streamlined construction and a method thereof.

Further, the present invention has as a second object the provision of a detection apparatus which has a small temperature drift and a high detection apparatus, and a method thereof, even for detection objects which are, for example, molten metal or other high temperature liquids.

According to the present invention, there is provided a liquid level detection apparatus having a probe, one end of which is inserted in the liquid and the other end of which is outside the liquid, which receives a buoyancy corresponding to the position of the liquid, an arm which is affixed to one end of the probe and with a free end opposing said fixed end receiving a force through a fulcrum in accordance with the buoyancy of said probe, and a force detecting means which is provided abutting against the free end of the arm and which detects the pressing force applied to the free end of the arm.

According to this construction, when the probe affixed to one end of the arm disposed in the substantially horizontal direction is inserted in the liquid, the probe receives a buoyancy from the liquid and the free end of the arm receives a pressing force corresponding to the buoyancy. At that time, the force occurring at the free end of the arm is detected by the force detecting means. Predetermined operational processing is performed on the detected force so as to calculate the depth of insertion of the probe into the liquid and detect the level of the liquid.

That is, the buoyancy received by an object in the liquid, in accordance with the Archimedian principle, is equal to the product of the volume of the object and the specific gravity of the liquid, so if the specific gravity of the liquid is constant, changes in the volume of the probe in the liquid, that is, the changes in the depth of penetration, are proportional to the changes in the buoyancy. Using this, predetermined operational processing is performed and the level of the liquid is accurately detected.

Preferably, the arm is shaped as a crank and the height of the said fulcrum and the height of the level of the said liquid are made to substantially coincide.

By this, it is possible to prevent the force in the horizontal direction, which is irrelevant to the buoyancy received by the probe, from being applied to the force detecting means side, whereby the precision of detection of the level of the liquid is improved.

More preferably, at least the said probe, arm, and buoyancy detector may be carried on a vertically movable carrier and be raised and lowered horizontally and the carrier may be provided with a detecting means for measuring the distance of elevation.

If this is done, then it is possible to raise and lower the probe too in accordance with the height of the liquid level and it is possible to keep constant the depth of insertion of the probe at all times.

Even more preferably, a compensator with a coefficient of thermal expansion larger than said arm may be arranged in close contact along the arm, the arm and the compensator may be fixed at the probe end, and the opposing end of the compensator may be made a free end.

If the liquid level detection apparatus of the present invention is used for the detection of the level of a molten metal, for example, the molten metal will be a high temperature of at least 1000° C., so the arm will expand due to the heat. The effects of this thermal expansion are large at the side from the support to the molten metal and are almost nil at the side from the support to the force detection means. Therefore, as is, the ratio of the distance to the two sides of the arm from the support would differ from that at ordinary temperature and an error would occur in the calculation of the level of the liquid based on the buoyancy.

According to the above construction, however, the arm is supported by a support, so the arm heated by heat of the molten metal will elongate toward the end connected to the probe starting from the support. On the other hand, the compensator is affixed at one end of the arm, but is not affixed at the support side, so the compensator heated by the heat of the molten metal will elongate toward the free end side starting from the side affixed to the arm. As a result, the elongations of the two ends will be cancelled out and the thermal expansion or contraction of the arm can be automatically compensated for and thus the effects of temperature on the measurement of the level of the molten metal can be greatly suppressed.

Further, when using the above apparatus for detecting the level of a liquid, it is also possible to first raise or lower the probe so as to insert the probe in the solution, compare the distance of movement of the probe at that time and the distance of movement of the probe obtained by operational processing based on the buoyancy received by the probe, and make automatic corrections based on a coefficient of correction obtained from the difference of the two. If this is done, then the various parameters, such as the sectional area of the probe and the specific gravity of the liquid, required for the operational processing can be automatically corrected and the precision of measurement raised.

BRIEF DESCRIPTION OF DRAWINGS

FIG. 15 to FIG. 17 are explanatory views of a semi-continuous casting facility to which the fourth embodiment is applied;

BEST MODE FOR CARRYING OUT THE INVENTION

Figure 1:
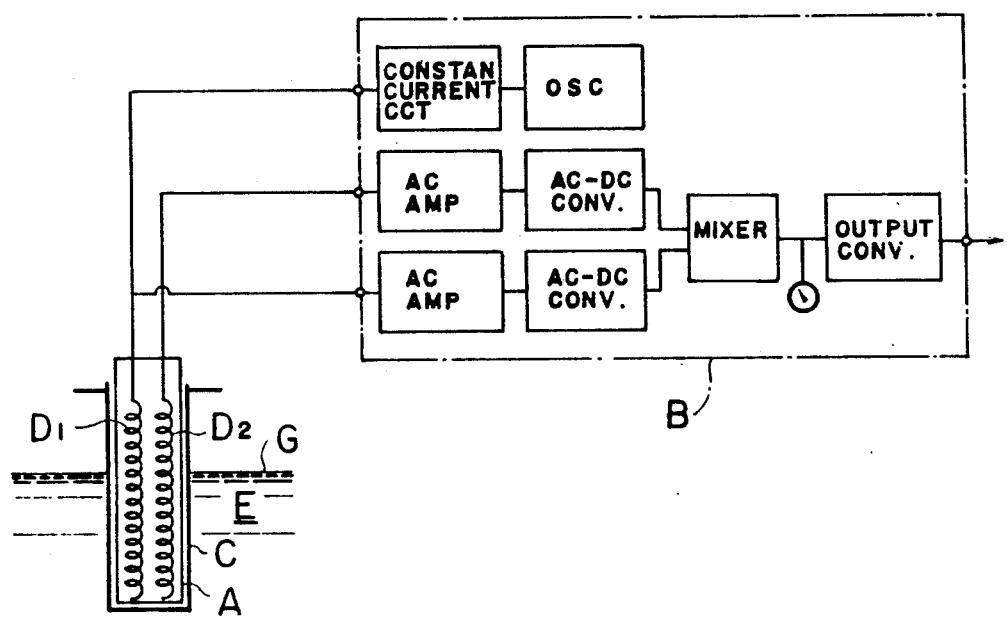
FIG. 1 and FIG. 2 are structural views showing the prior art.
Figure 2:
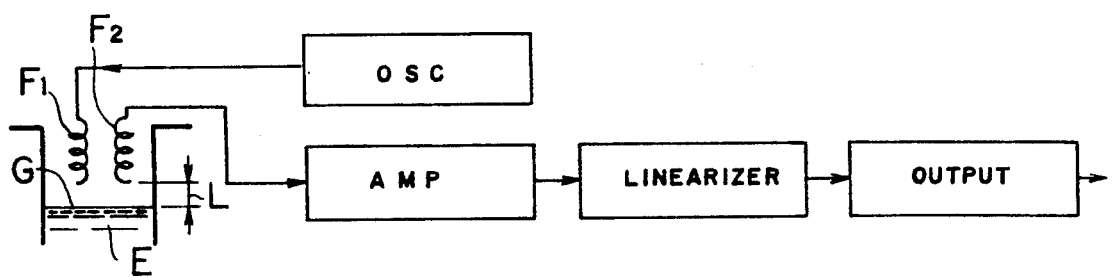
Figure 3:
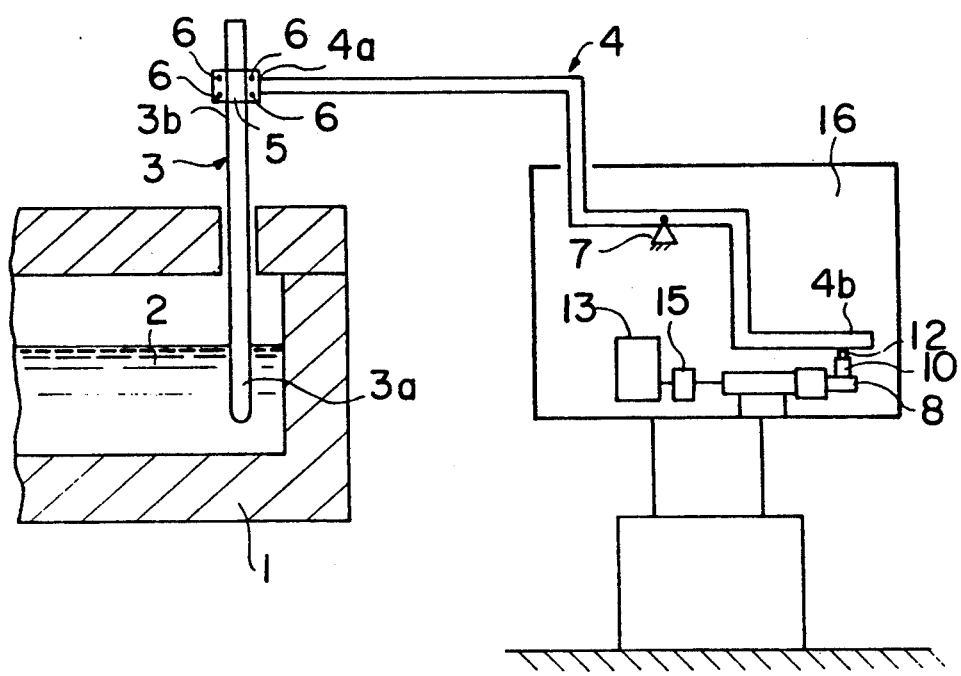
FIG. 3 is a structural view of a liquid level detection apparatus of a first embodiment of the present invention.

FIG. 3 shows a first embodiment of the present invention and shows a liquid level detection apparatus used for the detection of the level of a molten metal of a high temperature.

Figure 4:
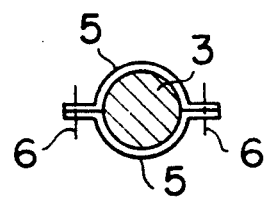
FIG. 4 is an enlarged sectional view showing the mounting structure of the probe and arm shown in FIG. 3.

In a molten metal tank 1 a molten metal 2 is charged. In the molten metal 2 is inserted the bottom portion 3a of a rod shaped probe 3. The probe 3 is superior in heat resistance and is formed from a ceramic with a relatively small coefficient of thermal expansion. The top 3b of the probe 3 is connected to one end 4a of an arm 4. Specifically, as shown in FIG. 3 and FIG. 4, the probe 3 is clamped between two clamps 5, 5 mounted at the tip of the arm 4 and is affixed by tightening the two clamps 5, 5 by screws 6. To replace the probe 3, the screws 6 are loosened and the probe 3 is removed. In this way, the present embodiment facilitates the adjustment of the mounting position of the probe 3 and the exchange work and other maintenance by a simple operation of the screws 6.

The arm 4 is held substantially horizontally by the support 7 at its center of gravity. The weight of the arm 4 is kept from being applied to the force detector 8 connected to the other end 4b of the arm as much as possible. Further, the arm 4 forms a crank in shape, the fulcrum formed with the arm 4 by the support 7 is made substantially the same height as the position of the molten metal 2, and the flow of the molten metal 2 is made to give as small a moment to the probe 3 as possible. Also, the arm 4 is formed by a material superior in rigidity or is formed to a shape superior in rigidity and will not bend or warp, so that the buoyancy received by the one end 4a of the arm 4 is transmitted as accurately as possible to the force detector 8.

Figure 5:
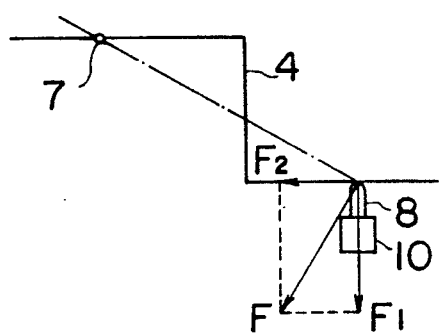
FIG. 5 is an explanatory view of the force applied to the force detector shown in Fig. 3.
Figure 6:
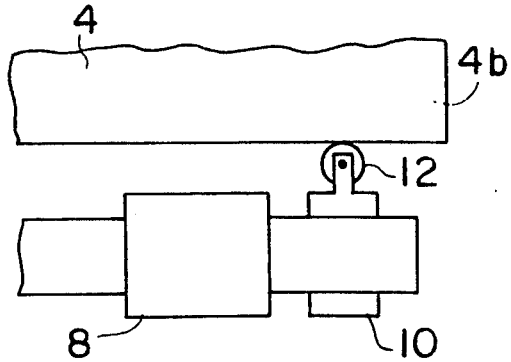
FIG. 6 is an enlarged view showing the vicinity of the force detector shown in FIG. 3.

The force detector 8 is constituted by a load cell. As shown in FIG. 5, the force F applied to the load cell can be broken down into a vertical component force F1 and a horizontal component force F2. Of these, only the vertical component force F1 is affected by the buoyancy of the probe 3, so it is necessary to keep to the minimum the force applied to the load cell in terms of the horizontal component force F2. Therefore, in this example, a bearing 12 is provided, as shown in FIG. 3 and FIG. 6, at the working point of the top of the load abutment 10 of a commercially available load cell so as to allow the horizontal component force F2 to be dispersed. This improves the precision of measurement.

The force detector 8 is connected to a signal processor 13, which performs operational processing on the electrical signals output from the force detector 8, finds the level of the molten metal 2 in the molten metal tank 1 and, further, displays the detected level of the liquid. The operation is described below.

Figure 7:
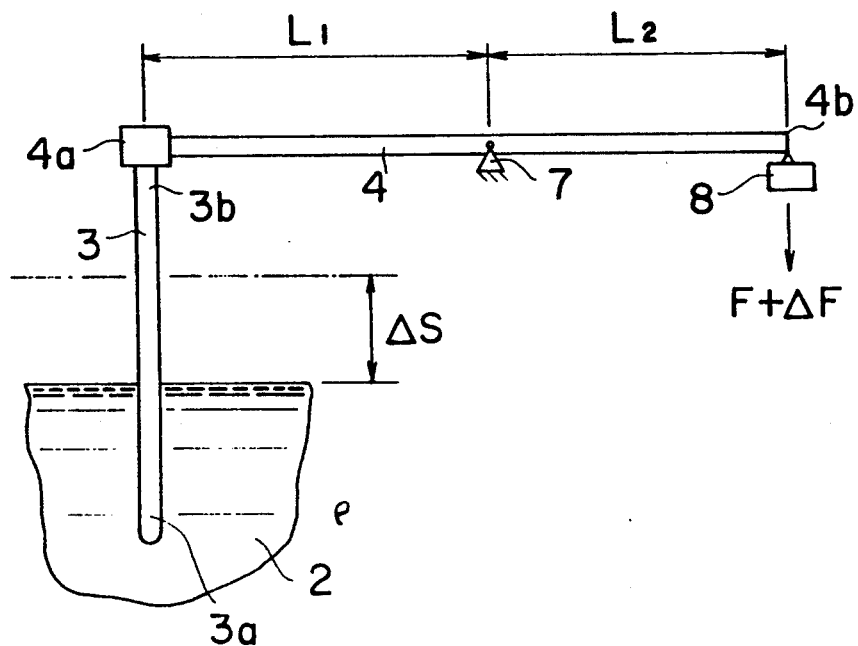
FIG. 7 is a view of the basic structure of the first embodiment.

The basic structure of the apparatus shown in FIG. 3 is shown in FIG. 7. Assume the distance from the fulcrum 7 of the arm 4 to the center of the probe, provided at one end 4a thereof where the buoyancy is received, is L1, the distance to the working point to the force detector 8 of the other end is L2, the outer diameter of the probe 3 is D and the specific gravity of the molten metal 2 is $\rho$. The change $\Delta F$ of the force received by the force detector 8 in the case of a rise of the liquid level from the state illustrated and a change of the depth of penetration of the probe 3 by exactly $\Delta S$ may be found by equation (1):

$$\Delta F = (L1/L2)(\pi/4)D^2 \rho \Delta S \tag{1}$$

Here, if it is assumed that L1, L2, D, and $\rho$ are constant, then $\Delta F$ is proportional to $\Delta S$. Therefore, by inputting L1, L2, D, and $\rho$ in advance to the signal processing circuit 13 and accurately measuring $\Delta F$, the change in the depth of penetration of the probe 3, that is, the change in position $\Delta S$ due to the increase or decrease of the molten metal 2, can be found from equation (2).

$$\Delta S = \Delta F / k \tag{2}$$

where, $k = (L1/L2)(\pi/4)D_2\rho$

Further, in this example, a low pass filter 15 is disposed between the force detector 8 and the signal processing circuit 13. That is, since the environment of factories engaged in, for example, the melting and casting of metals is considerably severe, there is the effect of mechanical vibration. Such mechanical vibration is transmitted to the molten metal detection apparatus and creates large vibration noise in the liquid position detection signals.

Figure 8:
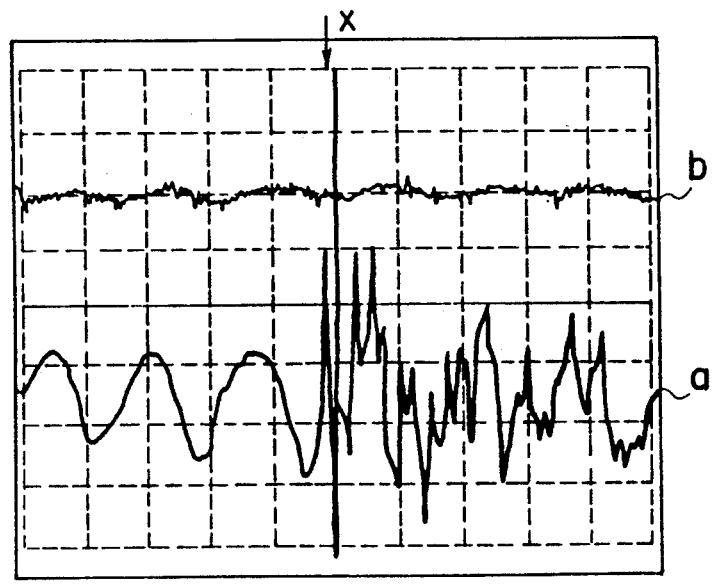
FIG. 8 is a view showing the effects of external noise.

If vibration is given artificially at the time of point X to the liquid level detection apparatus as noise to investigate the output waveform of the load cell, the result is signal a of FIG. 8. As clear from this figure, not only the noise due to the mechanical vibration is extremely great, but also the frequency of vibration is irregular. To eliminate this, one may lay a rubber vibration absorber under the detection apparatus, but a rubber vibration absorber is poor in heat resistance, so is unsuitable for a detection apparatus for molten metal as in this example.

Therefore, in this example, the noise is electrically eliminated by the low pass filter 15. As a result, the noise is almost completely removed as in signal b of FIG. 8.

The above-mentioned arm 4, support piece 7, force detector 8, signal processing circuit 13, and low pass filter 15 are housed in a shield case 16.

Note that in the above-mentioned embodiment, the arm 4 is shaped like a crank, but for example it may be straight in shape as in FIG. 7. The shape may be arbitrarily determined.

Further, the force detector 8 was provided under the other end 4b of the arm 4, but the position of installation is not limited to this. For example, it may be placed in the polar direction, above it, etc.

As mentioned above, in the present embodiment, use was made of a ceramic probe. Therefore, it is superior in high temperature resistance and does not use a coil, so the temperature drift is small and the precision of detection becomes higher.

Further, the probe is superior in high temperature resistance, so the interval of replacement of probes becomes longer. Further, the replacement of the probe is easy, so maintenance also is easy.

In addition, if the probe 3 is inserted deep into the molten metal 2, even if the level of the molten metal 2 declines somewhat, so long as the probe 3 receives the buoyancy of the molten metal 2, it is possible to detect the liquid level. Therefore, there is no need for adjustment of the measurable distance in accordance with a change of the level of the molten metal as in the past and measurement becomes easy.

Figure 9:
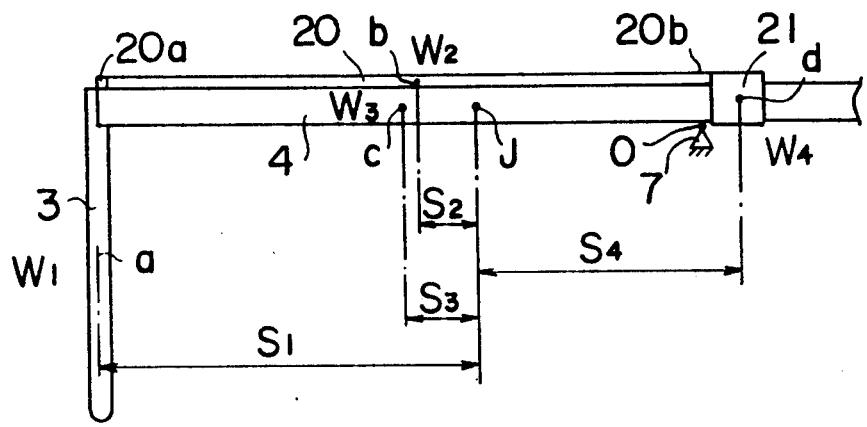
FIG. 9 is a structural view showing key portions of the liquid level detection apparatus of a second embodiment.

FIG. 9 shows a second embodiment of the present invention. In the embodiment, a compensator 20 formed in a rod shape of a material with a larger coefficient of thermal expansion than the arm 4 is attached so as to be in close contact on the arm 4. Since the compensator 20 is attached to be in close contact with the arm 4, the temperature distributions of the two become the same. If the coefficient of thermal expansion of the arm 4 is $\lambda 1$ and the coefficient of thermal expansion of the compensator 20 is $\lambda 2$, then $\lambda 2 > \lambda 1$.

the compensator 20 is affixed to the arm 4 at the end 20a of the arm 4 on the probe 3 side. The other end 20b is in a free state. The other end 20b of the compensator 20 has a weight 21 attached to it. The weight of the weight 21 is found by the relationship of the length of the arm 4, the length of the compensator 20, and the coefficient of thermal expansion of the same. Specifically, it is found in accordance with the following method:

Determination of Weight

In equation (1), showing the relationship of the change $\Delta S$ of the depth of entry and the change $\Delta F$ of the force applied to the force detector 8, the parameters D, $\rho$, L1, and L2 change according to the thermal expansion and contraction due to the effects of the temperature of the molten metal 2, which is about 1200° C. Of these, the outer diameter D of the probe 3 becomes larger as the temperature rises, while the specific gravity $\rho$ of the molten metal 2 becomes smaller as the temperature rises. Therefore, the fluctuations of the outer diameter D of the probe 3 due to changes in temperature and fluctuations of the specific gravity $\rho$ of the molten metal are mutually cancelled out and the effects on $\Delta F$ become so small as to be negligible.

Further, the section of the length L2 from the fulcrum o of the arm 4 to the working point of the other end b of the arm on the force detector 8 becomes considerably distant from the molten metal 2, so the temperature changes are small and the effects of the fluctuation on $\Delta F$ can be ignored.

The effects of temperature are the largest in the fluctuation of the length L1 from the center of the buoyancy received by the probe 3 provided at the end 4a of the arm 4 to the fulcrum o. The effects due to the fluctuation are considered to be based on the system shown simply in FIG. 10. Here, if it is assumed that the temperature changes of the arm 4 are the same at any position in the longitudinal direction, at room temperature, the moment M due to the gravity of the system with respect to the fulcrum o may be found by equation (3):

$$M = (1/2)L0W2 + L0W1 \\ = L0(W1 + W2/2) \tag{3}$$

where, L0 is the length from the fulcrum o of the arm at room temperature to the end 4a.

Since $L1 = L0 (1 + \Delta T \lambda)$ ($\lambda$ being the coefficient of thermal expansion), the moment M1 after the temperature rises by $\Delta T$ may be found by equation (4):

$$M1 = L0 (1 + \Delta T\lambda)(W1 + W2/2) \tag{4}$$

The difference $\Delta M$ of the moment produced may be found from the difference between equation (3) and equation (4) by equation (5):

$$\Delta M = L0 \Delta T\lambda(W1 + W2/2) \tag{5}$$

On the other hand, when the level of the molten metal 2 changes by $\Delta S$, the fluctuation $\Delta M$ of the moment with respect to the fulcrum o may be found by equation (6):

$$\Delta M = \Delta S(\pi/4)D^2\rho L0 \tag{6}$$

By inserting equation (5) into equation (6) and converting the fluctuation of the moment $\Delta M$ due to the heat expansion into a fluctuation of the liquid level $\Delta S$ (or $\Delta \epsilon$), equation (7) is obtained:

$$L0\Delta T\lambda(W1 + W2/2) = \Delta S(\pi/4)D^2\rho L0 \Delta S = \Delta T\lambda(2W1 + W2)/(\pi D^2 \rho) \tag{7}$$

From the above-mentioned equation (7), the following may be understood:

The coefficient of thermal expansion $\lambda$ of the material is considerably small, but the weight (2W1+W2) of the probe 3 and the arm 4 is very large compared with the buoyancy. Further, the fluctuation of the temperature $\Delta T$ is also very large, so the fluctuation of the liquid level $\Delta S$ (or $\epsilon$), which is the error of detection due to the heat expansion, is considerably large and cannot be ignored.

The above-mentioned fluctuation of the liquid level $\Delta \epsilon$ becomes smaller the larger the outer diameter D of the probe 3, but if the outer diameter D becomes larger, the weight W1 also becomes greater, so the combination of the two must be considered.

To make the fluctuation of the liquid level $\Delta \epsilon$ smaller, the weights W1 and W2 should be made as light as possible.

Here, consideration will be given to only the moment of the force in the vertical direction and the following assumptions will be made with the position of the center of gravity of probe 3 and the clamp 5 supporting the same as a and the weight of the center of gravity position as W1:

The arm 4 and the compensator 20 are sufficiently narrow and sufficiently long, so the distribution of temperature in the longitudinal direction becomes completely uniform.

The heat conductivities of the arm 4 and the compensator 20 are extremely good, so the temperatures of the same change in accordance with the changes in temperature of the environment, but the distribution of temperature in the horizontal direction is uniform along the entire length.

The heat conductivities of the materials of the probe 3, arm 4, and other members do not change in the range of change of temperature.

Figure 10:
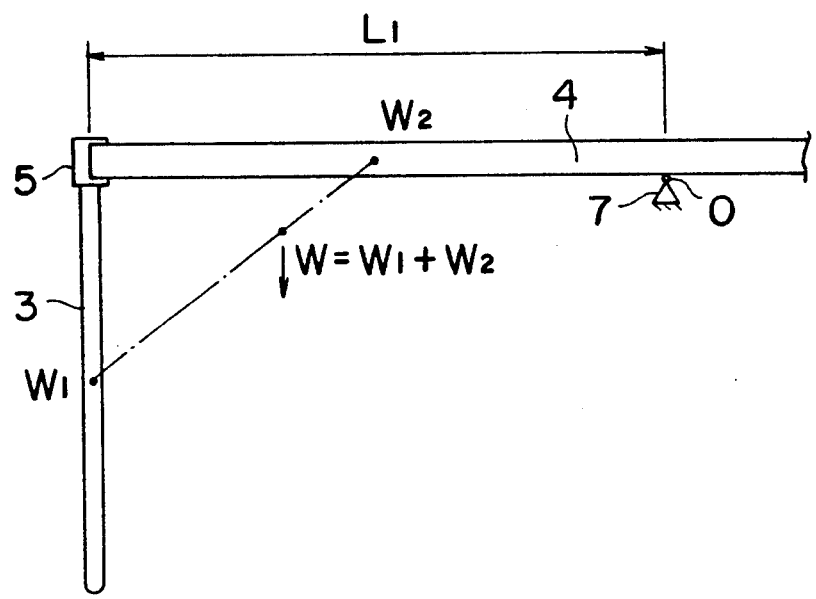
FIG. 10 is a view of the basic structure of the second embodiment.

In FIG. 9 and FIG. 10, b denotes the center of gravity position of the compensator 20, W2 denotes the weight of the compensator 20 at the center of gravity position, c denotes the center of gravity position of the arm 4, W3 denotes the weight of the arm 4 at the center of gravity position, d denotes the center of gravity position of the weight 21, and W4 denotes the weight at the center of gravity position.

If the weight of the system at a certain temperature T0 is represented by J, then S1, S2, S3, and S4 in FIG.

8 show the distances in the horizontal direction from the positions of a, b, c, and d to the center of gravity J of the system. Equation (8) stands by these relationships.

$$W1S1 + W2S2 + W3S3 = W4S4 \quad (8)$$

Here, consider the case of the rise of the temperature of the system from T0 to T1 due to the change in ambient temperature. The changes in length with the arm 4 and the compensator 20 are made ΔL1 and ΔL3. To ensure that the position of the center of gravity of the system does not change, equation (9) must stand.

$$W1(S1+\Delta L1) + W2(S2+\Delta L1/2 - \Delta L3/2) + W3(S3 + \Delta L1/2) = W4(S4 + \Delta L3 - \Delta L1) \quad (9)$$

Here, the relationship of ΔL1 and ΔL3 is $$\Delta L3 = (\lambda 2/\lambda 1)\Delta L1 \quad (10)$$

so if equation (10) and equation (8) are inserted in equation (9), equation (11) is obtained.

$$W4 = [\lambda 1/(\lambda 2 - \lambda 1)] \times [W1 - W2(\lambda 2 - \lambda 1)/2\lambda 1 + W3/2] \quad (11)$$

Therefore, by making the weight W4 of th weight 21 a value satisfying the above-mentioned equation (11), the center of gravity position J of the system will not be affected by the ambient temperature.

Specifically, for example, as the material of the arm 4, it is possible to use SUS430 with a coefficient of thermal expansion λ1 of $13.1 \times 10^{-6}$, as the material of the compensator 20 it is possible to use SUS304 with a coefficient of thermal expansion λ2 of $20.1 \times 10^{-6}$, and as the weight 21, it is possible to use carbon steel.

Further, the following equation may be derived from the above-mentioned equation (11):

$$W4 + W2/2 = \lambda 1/\lambda 2 - \lambda 1(W1 + W3/2)$$

Here, if W4=0, then
$$W2/2 = \lambda 1/\lambda 2 - \lambda 1(W1 + W3/2) \quad (12)$$

That is, if there is no weight 21, temperature compensation can be performed by changing the length of the compensator 20, the weight distribution, etc. so as to make the various figures meet equation (12).

Note that in actuality the temperature distribution of the system is not uniform, so the position of the center of gravity J of the system will fluctuate slightly due to the nonuniformity of the temperature, but the effects of the molten metal 2 on the measurement of the liquid level can be considerably suppressed.

Further, in the present invention, it is possible not to provide the weight 21 at the other end 20b of the compensator 20 as in the above-mentioned embodiment, but to make the other end 20b thicker than the other end 20a of the compensator 20 so as to act in place of the weight 21 and to make the other end 20b satisfy the above-mentioned equation (11).

The third embodiment of the present invention relates to a specific operational processing at the signal processor 13, wherein, when processing the output signal of the force detector 8 by the signal processor 13, fine sampling is performed at a certain period and several periods' worth of data of the resonance frequency are averaged out to suppress the resonance noise.

This is done for the following reason.

The various constituent members of the liquid level detection apparatus have inherent frequencies of vibration in accordance with their length, weight, mass, etc. The inherent frequencies of vibration resonate with the external vibration from the environment in which the liquid level detection apparatus is installed. This resonance will be considered here. To simplify the explanation, consider the equation of motion of the measurement system shown in FIG. 11.

Figure 11:
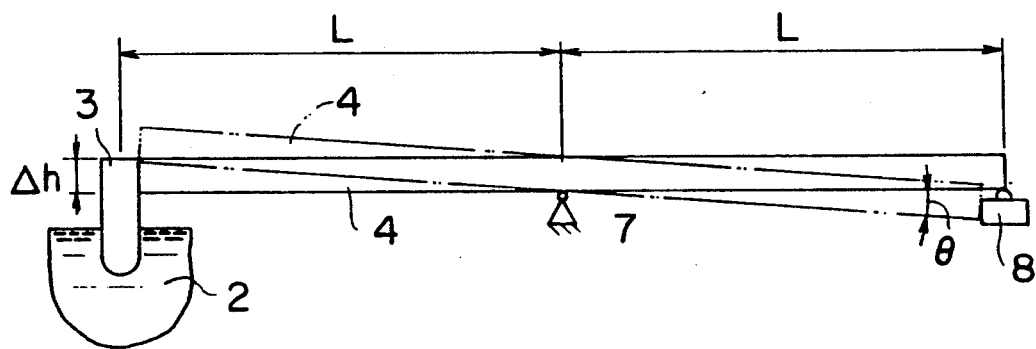
FIG. 11 is a view of the basic structure of a third embodiment of the present invention.

In the measurement system of FIG. 11, the displacement of th load cell used as the force detector 8 is extremely small, so it is possible to consider just the fine vibration of the extremely small range of the rotational angle $\theta$ (rod). Therefore, if $\sin \theta \approx \theta$, the equation of motion becomes the following:

$$\Delta h L \rho A = I(d^2\theta/dt^2) + L^2\theta K \quad (13)$$

where,
I: inertia moment of system
K: coefficient of elasticity of load cell
Δh: amount of change of level
A: sectional area of probe The following equation is derived from the above-mentioned equation (13):

$$\Delta h = (I/\rho LA)\cdot(d^2\theta/dt^2) + L\theta K/\rho A$$

If this is subjected to Laplace conversion, then
$$H = (I/\rho LA)\Theta s^2 + (LK/\rho A)\Theta \quad (14)$$

$$\Theta/H = \rho LA/[s^2 + (L^2K/I)]$$

where,
H is a Laplace conversion of h,
Θ is a Laplace conversion of θ, and
S is a Laplace conversion of operator.

The sensitivity of the sensor is proportional to the parameters ρ, A, and L, and the resonance angle frequency ω becomes as in the following equation:

$$\omega = (L^2K/I)^{\frac{1}{2}} \quad (15)$$

Next, consideration will be given to the force F applied to the force detector 8.

$$\Theta = \Theta_m \sin \omega t \quad d^2\Theta/dt^2 = -\Theta_m\omega^2 \sin \omega t$$

$$I(d^2\Theta/dt^2) = -(I\Theta_m\omega^2 \sin \omega t = -\Theta_m L^2 K \sin \omega t$$

Further, from $F = L^2\Theta$, $$F = \Delta h L \rho A + \Theta_m L^2 K \sin \omega t \quad (16)$$

The force F given to the force detector 8, by equation (16), becomes the combined force of the buoyancy of the probe 3 and the force due to the resonance. The force due to the resonance is the greatest cause of error. If this resonance is suppressed by mechanical means, a detrimental effect will be given to the sensitivity of the sensor, so this should be avoided if at all possible. Further, it is possible to eliminate the resonance noise by the electrical low pass filter 15, but usually the resonance frequency of the system is extremely low (about 10 Hz) and further the amplitude is greater than the level signal, so use would have to be made of a low pass filter with an extremely low cutoff frequency to completely cut out the resonance noise. If this is done, then the level signal is liable to be also simultaneously cut.

That is, it is necessary to give consideration also to the response of the level system and the S/N ratio. Therefore, as explained above, it was decided to suppress the resonance noise by sampling the output signal of the force detector 8 etc.

Experimental Results

Figure 12:
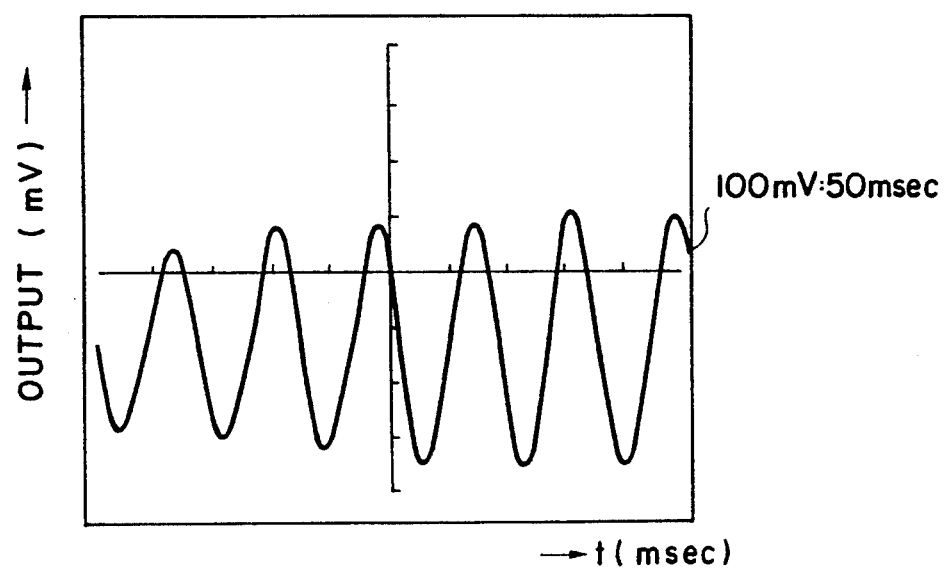
FIG. 12 is a view showing the effects of noise of the third embodiment.

The magnitude of the error due to the resonance in the detection apparatus was actually measured in an experimental chamber. That is, the output waveform of the force detector 8 was measured by a storage type oscilloscope, which waveform is shown in FIG. 12. The change in the output due to the change of 1 mm of the level of a melt of copper corresponds to about 36 mV, so the maximum error of the waveform shown in FIG. 12 corresponds to about 13 mm. The on-site environment is very severe, so it is considered that the error would be even greater.

In the present invention, the error due to the above resonance is made smaller by giving consideration to the following facts and performing digital signal processing on the output of the force detector 8.

The parameters L, K, and I affecting the resonance frequency $\omega$ of the system are relatively stable, as seen in equation (15).

In the liquid level detection apparatus of a molten metal, the demands on the response are not that severe.

As a concrete experiment, use was made of a computer to sample the output signals from the force detector 8 finely at set periods of 17 milliseconds, these were subjected to A/D conversion and stored in the memory, several periods' worth of data of the resonance frequency were averaged by the computer, the result was converted to the level, and this was shown on the display.

The following experiment was performed for confirming the effects of the digital signal processing method.

A probe 3 was inserted into water and the level of insertion was made to remain unchanged. Use was made of a computer to calculate the average value of the data by the above method. In this case, the number of bits of the data averaged was N and N was increased from 3 by 90 bits each. The average Value AV was calculated by the following equation.

$$AV = \sum_{i=1}^{N} Ri/N$$

Figure 13:
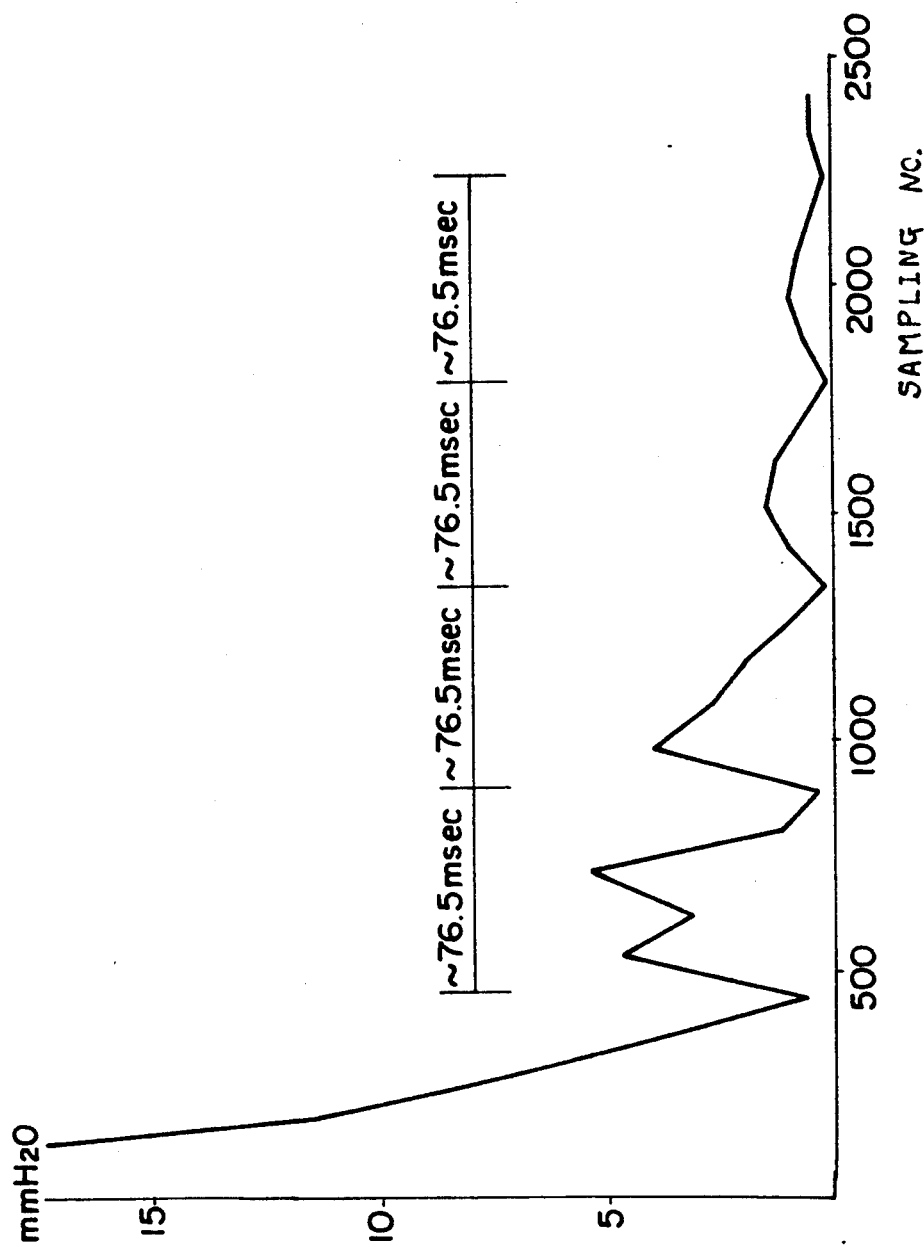
FIG. 13 is a graph showing the results of experiments of the third embodiment.

When N is the same, one average value is taken every 3 milliseconds, the maximum and minimum values are searched for from 300 average values, and the difference is calculated to determine the maximum deviation. FIG. 13 shows the number of bits of data N. The abscissa in the figure shows the number of bits of data N averaged and the ordinate shows the maximum deviation.

From the results of the experiment it was confirmed that the effects of the present method are very great and the following was learned.

The resonance period of the detection apparatus used for the experiment was about 76.5 milliseconds.

The maximum deviation was the smallest in the case where the sample time of the n bits of data (N×0.17 milliseconds) was substantially a whole multiple of the resonance period, that is, the case where N=450, 900, 1350, 1800, 2250, . . .

The larger the absolute value of N, the smaller the fluctuation of the maximum deviation. In other words, if N is made larger by a certain extent, there is no major error caused even if the resonance frequency of the measurement system fluctuates somewhat. Instead, the response of the liquid level detection apparatus becomes somewhat slower.

The N of the apparatus used for the experiment wad made 1800. That is, it took about 0.3 second to calculate one bit of level data.

Figure 14:
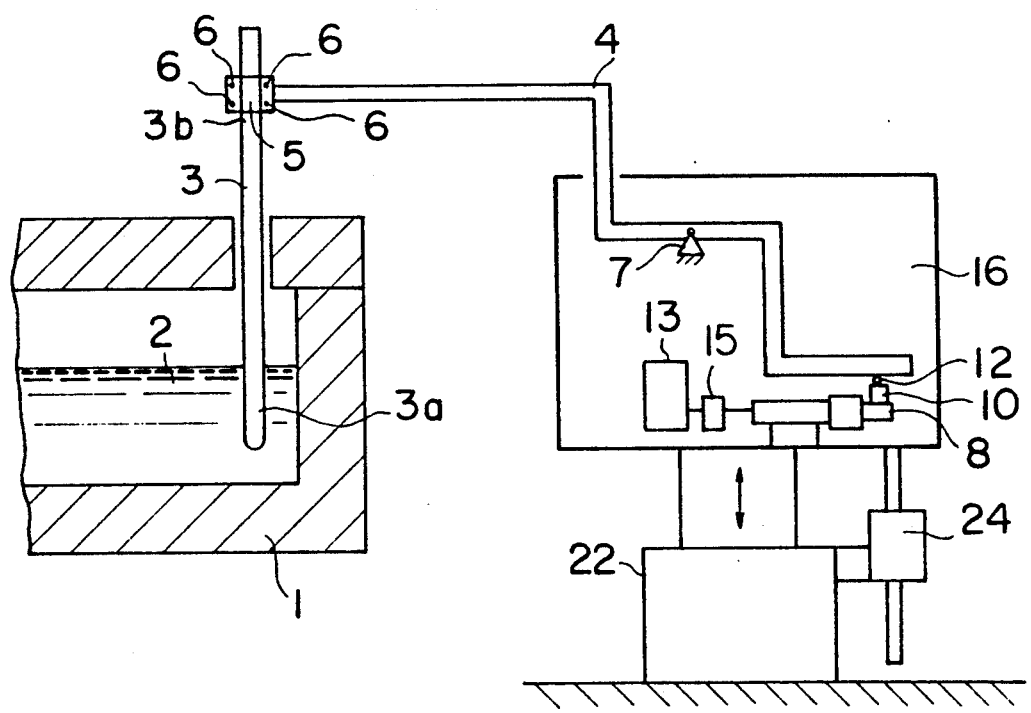
FIG. 14 is a structural view showing a fourth embodiment of the present invention.

FIG. 14 shows a fourth embodiment of the present invention. As shown in the figure, in the example, at the bottom of a shield case 16 housing the arm 4, the force detector 8, the signal processing circuit 13, and the low pass filter 15 in the above embodiments is connected a carriage for moving the same up and down. By raising or lowering the carriage 22, at the very least the probe 3, the arm supported by the support 5, and the force detector 8 may be moved up and down while being held horizontal. Further, the carriage 22 is provided with a displacement sensor 24 for measuring the distance of upward or downward travel. Specifically, as the carriage 22, use is made of a Z-stage and as the displacement sensor 24, use is made of a linear scale. The carriage 22 may be operated in accordance with the upward or downward movement of the level of the molten metal 22 so as to move the probe 3 up and down.

The construction of the above example was used for the following reasons:

This example is suited for use for detection of the liquid level in a method for control of the level of a melt in a semicontinuous casting facility as shown in FIG. 15.

Figure 17:
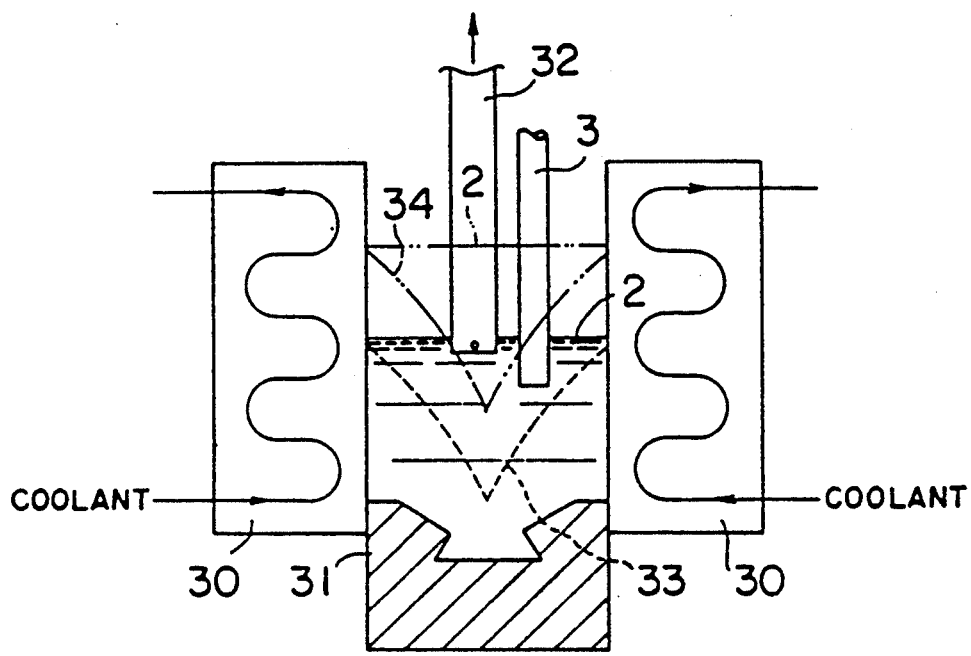

The control method illustrated entails pouring the molten metal 2 from a spout 32 to a receiver 31 arranged between molds 30 and, when the molten metal which has been poured solidifies, lowering the receiver 31 in the arrow direction of FIG. 16, pouring molten metal 2 from the spout 32 again on the molten metal 2, and repeating this until exactly the desired amount is poured in the casting mold 30 as shown in FIG. 17.

In this method of controlling the level of the melt in a semicontinuous casting facility, correct detection of the level of the molten metal 2 requires that the depth of insertion of the probe 3 in the molten metal 2 be kept constant at all times regardless of the amount of the molten metal 2 in the casting mold 30. That is, in the semicontinuous casting facility, as shown in FIG. 17, coolant water is passed inside the casting mold 30. Therefore, the molten metal 2 gradually solidifies from the vicinity of the casting mold 30. As a result, as shown in FIG. 17, there is a boundary 33 between the solid and liquid in the molten metal 2 and, further, this boundary 33 rises to the position of 34 along with the gradual rise in the level of the molten metal 2. In this case, if the probe 3 is fixed and does not rise, there is a danger that the probe 3 will be caught as the molten metal 2 solidifies. If this happens, the liquid level detection apparatus will become unable to measure the level and further the slab may have to be scrapped. Therefore, the depth of insertion of the probe 3 must be accurately controlled. However, if the probe 3 is fixed in position even if the level of the molten metal 2 rises, the depth of insertion of the probe 3 in the molten metal 2 ends up changing, so it becomes impossible to detect the liquid level accurately.

Therefore, in this example, as mentioned earlier, the carriage 22 is made to rise and fall and the probe 3, arm 4, etc. are held in a horizontal position in accordance with the change of the liquid level by moving them up and down so as to hold the depth of insertion of the probe 3 constant at all times.

Further, in this example, the carriage 22 is provided with a displacement sensor 24 able to measure the distance of upward and downward movement, so it is possible to control the distance of upward and downward movement of the carriage 22 and in turn the distance of elevation of the probe 3.

Next, use will be made of the detection apparatus having a vertically movable carriage 22 shown in the above forth embodiment and an explanation will be made of a method of correction of the parameters of the apparatus.

In a liquid level detection apparatus for a molten metal, it is important to insert the probe 3 vertically into the molten metal to raise the precision of detection. If the probe 3 is inserted into the molten metal at an angle, the cross-sectional area will differ from the case of insertion of the same probe 3 vertically. Therefore, even if the level of the molten metal is the same, the buoyancy received by the probe 3 will differ and measurement error will occur.

The lifetime of the probe 3 coming into direct contact with the high temperature molten metal 2 is limited, so the probe must be replaced after a certain period has passed after use. If the probe 3 is replaced, the state the mounting of the probe 3 will change and it will be difficult to insert the probe 3 vertically into the molten metal 2 in the same state.

Further, the environment of installation of the liquid level detection apparatus of the molten metal 2 is a high temperature one, so it is demanded to remove it or install it without interfering with other work. Therefore, it is difficult to hold the detection apparatus itself horizontal.

To detect the liquid level with a high precision, it is necessary to compensate for the parameters having direct relationship with the detection of the liquid level. The following parameters are important in this case.

Outer Diameter of Probe

With ceramics, it is difficult to raise the dimensional precision, so there is a large variation in the outer diameter D of the probe 3. Further, the outer diameter of the probe 3 varies due to the fact that oxides floating in the molten metal 2 adhere unevenly to the surface of the probe 3.

Angle $\beta$ of Centerline of Probe and Vertical Direction

The angle $\beta$ ideally is $\beta=0$ degrees, but in actuality there is an error of over $\pm 5$ degrees. If the effects of $\beta$ are considered, equation (1) becomes as follows:

$$\Delta F = (1/\cos \beta) \times (L1/L2) \times (\pi/4) D^2 \times \rho \times \Delta S \quad (17)$$

Horizontal Degree of Liquid Level Detection Apparatus for Molten Metal 2

The moment due to the weight of the system changes according to the degree of horizontalness, and the load angle of the force detector 8 changes as well.

Specific Gravity $\rho$ of Molten Metal

There is insufficient standard data on the specific gravity of high temperature molten metal and accurate values are not available. Further, impurities are mixed into molten metals for various purposes, so even if the specific gravities of high temperature molten metals are known to a certain extent, it is not possible to obtain an accurate grasp of the specific gravities due to the types and amounts of intermixture of impurities etc.

Position of Installation of Load Cell

The moment of the repulsion force of the load cell changes according to the change of the position of installation.

These parameters have one thing in common, that is, to give a linear effect to the measurement of the level of molten metal. In this example, this common point is taken note of.

A vertically movable carriage 22 is operated to insert the probe 3 into the molten metal 2. The distance of elevation of the carriage 22 is measured by a displacement sensor 24 and the depth of insertion of the probe 3 is read. Based on the read depth of insertion and buoyancy of the molten metal 2 received by the probe 3, a comparison is made with the depth of insertion output from the said signal processor 13 and an automatic correction is performed by computer based on the coefficient of correction of the difference of the two.

Figure 18:
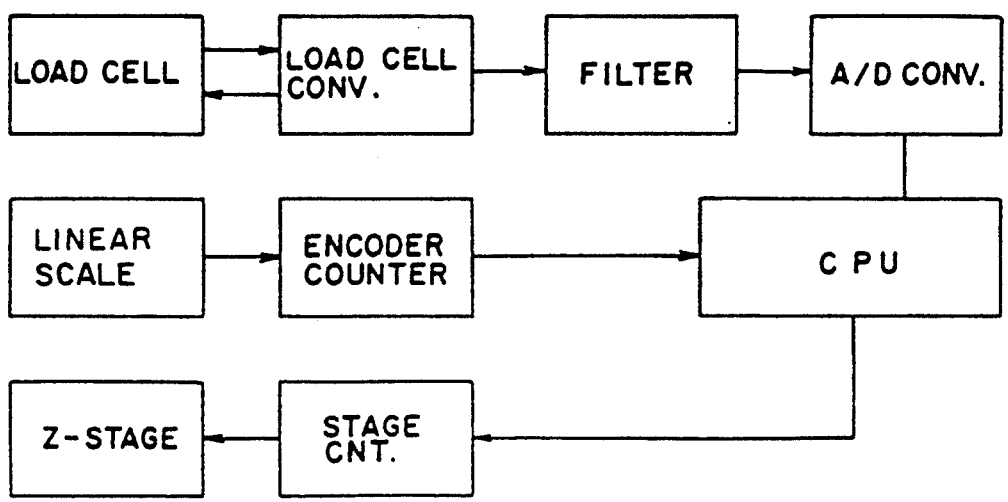
FIG. 18 is a block diagram of an apparatus construction making corrections in a fourth embodiment.
Figure 19:
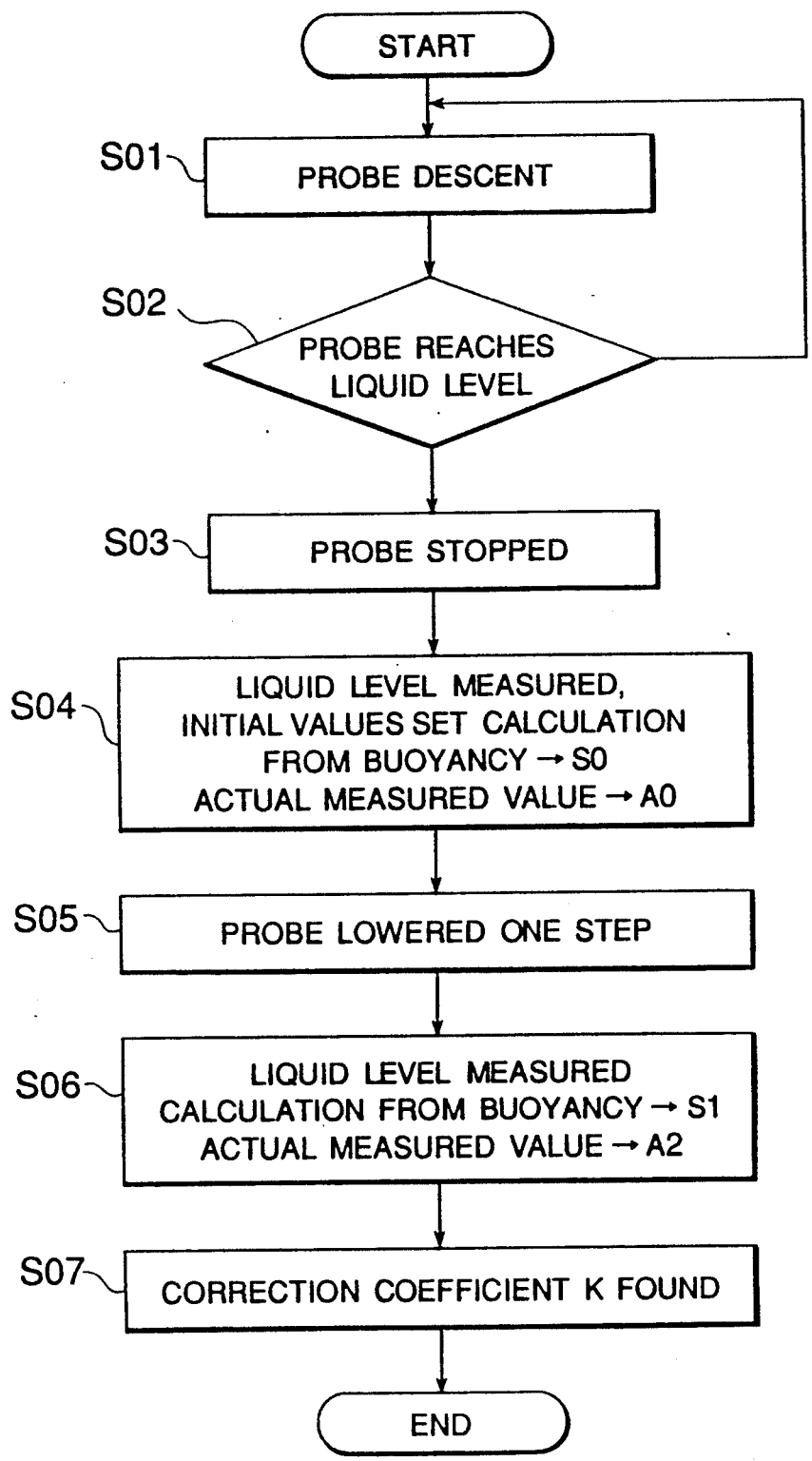
FIG. 19 is a flow chart showing corrective processing in the fourth embodiment.

Specifically, the result becomes as shown in the block diagram of FIG. 18 and the flow chart of FIG. 19:

Step 01 to Step 03

The liquid level detection apparatus of the molten metal is set so that the probe 3 is inserted into the molten metal.

As the method of setting, it is visually confirmed that the probe 3 actually enters the melt or detection is made of the receipt of the buoyancy by the probe 3.

Step 04

A personal computer reads the output of the A/D conversion board first, then records the level processed based on the buoyancy as the initial value S0. At the same time, it reads the results of a counter of an encoder and stores the level measured by the linear scale as the initial value A0.

Step 05

The personal computer lowers the Z-stage to a certain position through a stage controller at the timing of the least fluctuation of the level of the molten metal.

Step 06 to Step 07

The personal computer reads the output S1 of the A/D conversion board and the output A1 of the encoder in the same way as the above-mentioned B and calculates the correction coefficient K from the following equation:

$$K = (A1 - A0)/(S1 - S0) \quad (18)$$

This ends the correction.

After this, the normal work for detection of the level of the molten metal begins. The personal computer reads in the output $S_x$ of the A/D conversion board in the same way as B and calculates the relative level as the following equation:

$$S = K(S_x - R0) + A0 \quad (19)$$

Figure 20:
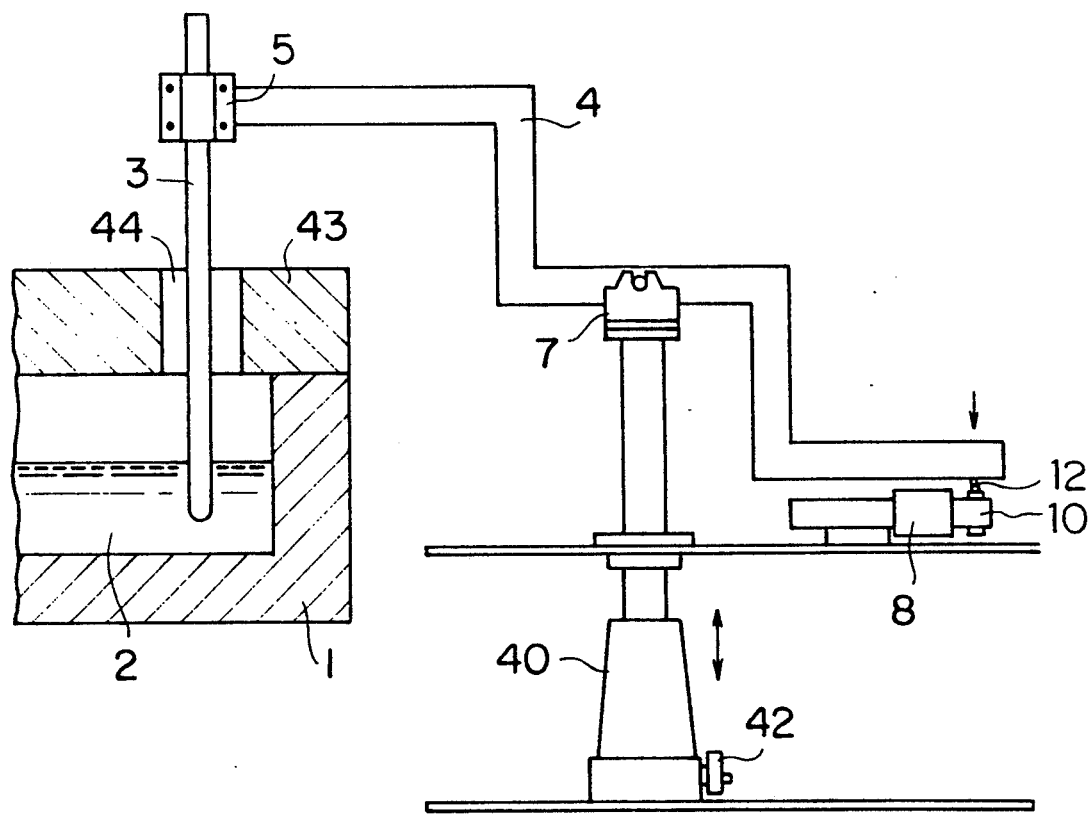
FIG. 20 is a structural view showing an apparatus used for the experiment of the fourth embodiment.

To confirm the effects of the present invention, an on-site test was performed using an electric furnace. The carriage construction of the experimental apparatus was as shown in FIG. 20 and was substantially the same as the apparatus of FIG. 14, but in the experimental apparatus, use was made of a jack as the carriage 40 and human force was employed to move the liquid level detection apparatus for the molten metal on the carriage 40. The carriage (jack) 40 was moved up and down by rotation of the height adjusting handle 42 to move up and down the probe 3. The amount of elevation of the probe 3 at this time corresponds to the change of the actual level of the molten metal, but since the inner diameter of the probe insertion aperture 44 formed in the cover 43 of the electric furnace is only 110 mm, consideration must be given to the volume effect of the probe 3, i.e., the fixed rate change of the level of the melt of the cover 43 due to the change of the depth of insertion of the probe 3. The volume effect is corrected by the personal computer.

Further, in this test, the time constant $\tau$ of the low pass filter 15 was set to 0.35 sec., 1 sec., and 3 sec.

In this state, the data was obtained by the above-mentioned correction routine. The output of the linear scale (measured value) was used as standard data and was made the actual measured value of the detection apparatus based on the output of the load cell.

Figure 21:
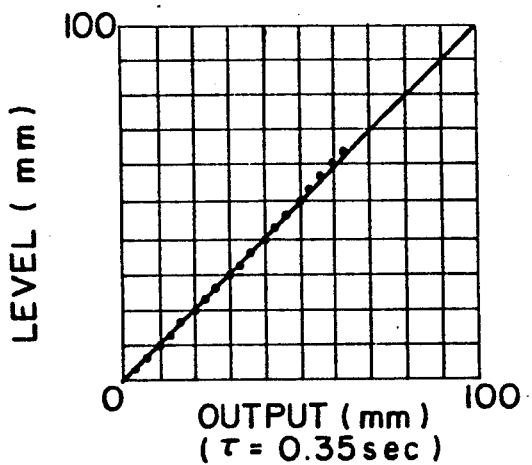
FIG. 21 to FIG. 23 are views showing the results of the experiment of the fourth embodiment.
Figure 22:
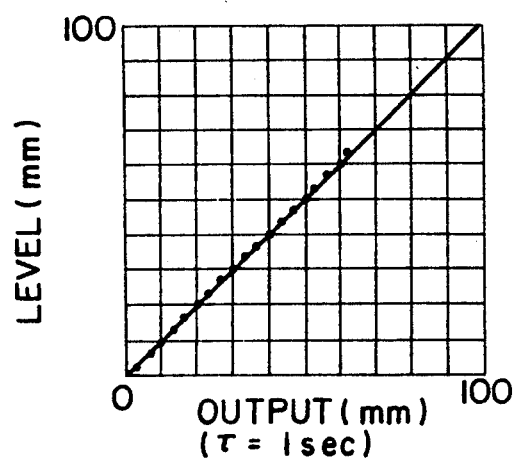
Figure 23:
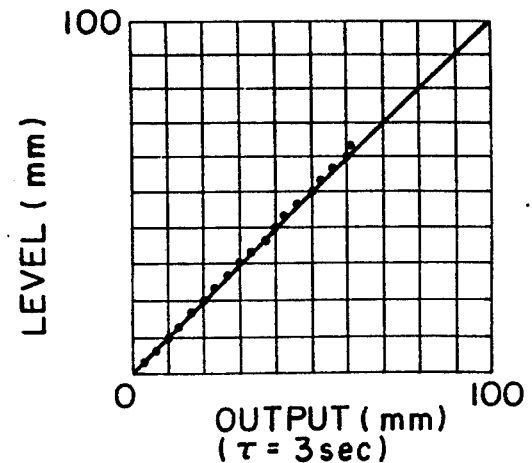

The results of the test are shown in FIG. 21 to FIG. 23 by the individual time constants of the low pass filter. In all figures, the abscissa shows the measured value of the linear scale and the ordinate shows the depth calculated based on the buoyancy.

The following was confirmed by the test.

When the liquid level detection apparatus of the molten metal was mounted on the carriage 40, the degree of horizontalness was not corrected at all, but just with the correction of the parameters by the correction method of the present invention, no major detection error occurred. The usefulness of use of the low pass filter was confirmed. The measurement error was a maximum of 1.8 mm. The maximum error arising in the case of giving artificial vibration by a wooden hammer was about 1.5 mm. The vibration around an electric furnace is not large, so no large error occurs even if the time constant $\tau$ of the low pass filter is set to 0.3 second.

Figure 24:
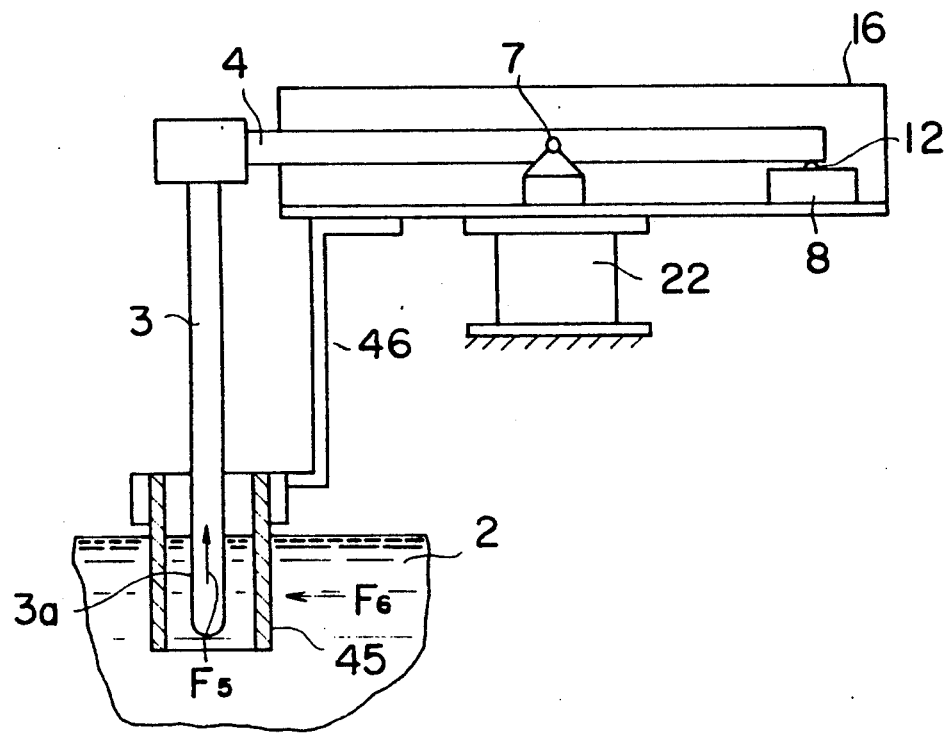
FIG. 24 and FIG. 25 are structural views showing a fifth embodiment of the present invention.
Figure 25:
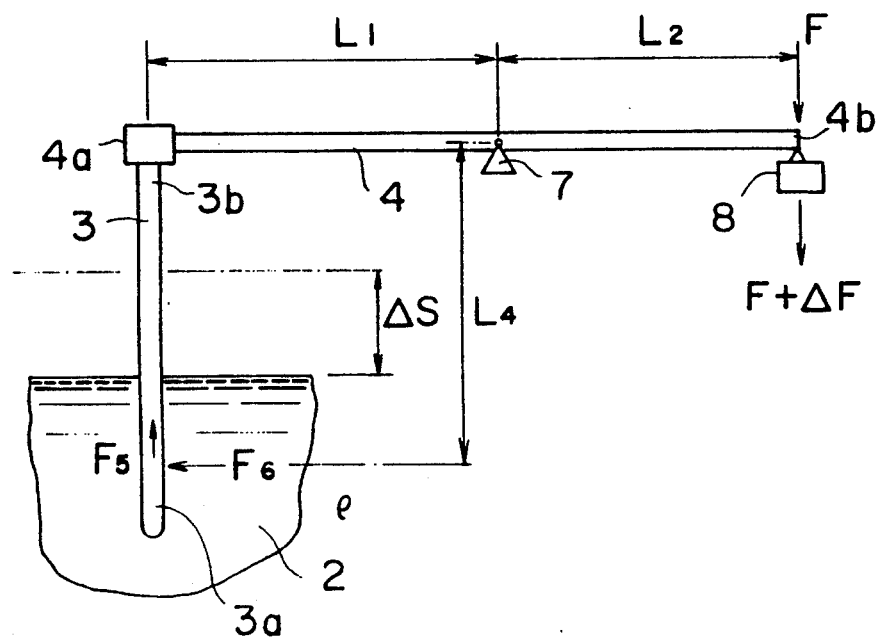

FIGS. 24 and 25 show a fifth embodiment of the present invention. As shown in the figure, in the example, the area around the bottom 3a of the probe 3 inserted in the molten metal 2 is covered by placement of a cylindrical shield pipe 45. The shield pipe 45 is fabricated from a high temperature resistant material such as ceramic and the inner diameter of the shield pipe 45 is larger than the outer diameter of the probe 3. Further, the shield pipe 45 is open at the top and bottom so that molten metal 2 can flow into the shield pipe 45. The shield pipe 45 is attached to the shield case 16 by a connecting member 46. If the probe 3 is moved up and down by the operation of the carriage 22, the shield pipe 45 is also moved up and down along with the same.

The shield pipe 45 is provided for the following reason:

As shown in FIGS. 24 and 25, the molten metal 2 is fluid in the molten metal tank 1. When measuring the level of the flowing metal, the bottom portion 3a of the probe 3 acts as an obstruction to the flow and a force such as F6 is received from the melt. Further, there is a chance of occurrence of an eddy near the probe 3 due to the state of flow. Further, if the oxides floating in the molten metal 2 strike the probe 3, a large force is applied to the probe 3. To simplify the explanation, all of the forces in the horizontal direction are made F6. When this F6 exists, equation (1) becomes as follows:

$$\Delta F=(L1/L2)(\pi/4)D^2\rho\Delta S+\Delta F6(L4/L2) \qquad (20)$$

The $\Delta F6 (L4/L2)$ in this equation (20) clearly may be termed noise. Further, $\Delta F6$ is extremely unstable and it is difficult to accurately compensate for this by a signal processing method. It is fully conceivable that the level sometimes cannot be measured.

In this example, provision is made of the shield pipe 45 as mentioned above so that a force F6 in the horizontal direction is not applied to the probe 3.

Figure 26:
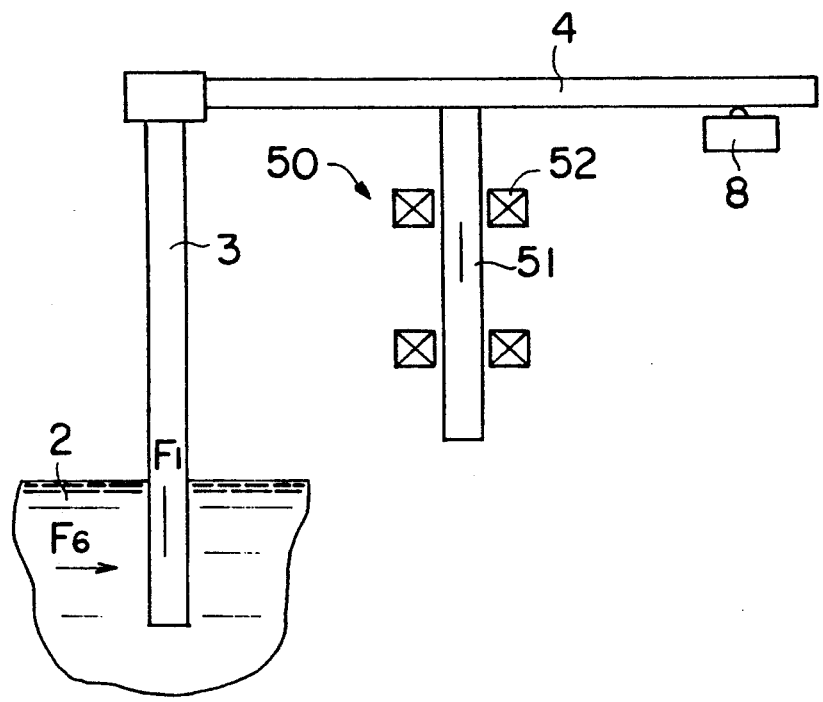
FIG. 26 and FIG. 27 are structural views showing a sixth embodiment of the present invention.
Figure 27:
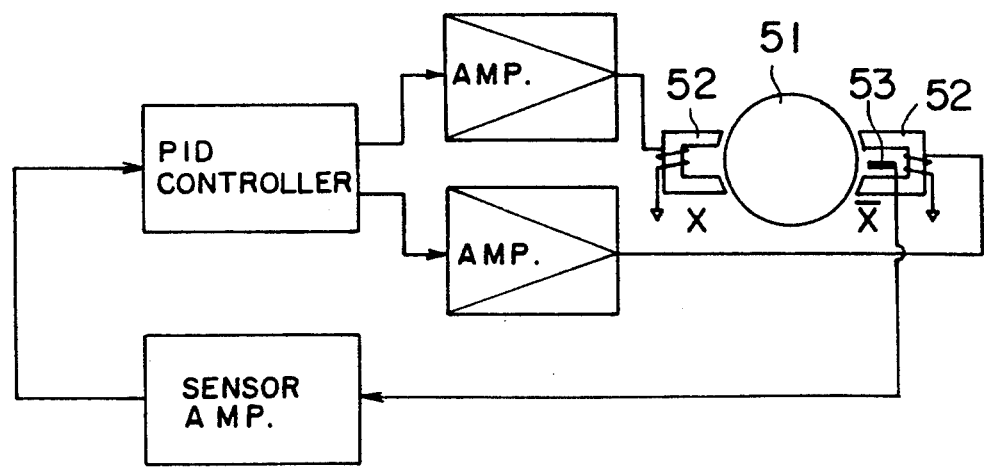

FIG. 26 and FIG. 27 show a sixth embodiment of the present invention. In this invention, use is made of a magnetic bearing apparatus 50 for supporting the arm 4. This magnetic bearing apparatus 50 has a supporting shaft 51 formed of a magnetic body. Electromagnets 52 are disposed around the outside of the supporting shaft 51 at two positions at the top and bottom. Further, a displacement sensor 53 is provided. The distance from the supporting shaft 51 is detected by the displacement sensor 53, and the amount of conductance to the electromagnets 52 is controlled by a controller so that the supporting shaft 51 does not contact the electromagnets 52. By this, the supporting shaft 51 is held standing in the noncontact state.

If such a magnetic bearing apparatus 50 is used for the liquid level detection apparatus, the force F6 in the horizontal direction applied due to the flow of the molten metal 2 etc. to the probe 3 does not affect the force detector 8 due to the guide function of the magnetic bearing apparatus 50, that is, the function of receiving magnetic force from the electromagnets 52 so as to hold the supporting shaft 51 in the noncontact state. Further, since the noncontact method is used, there is little loss and the buoyancy applied to the probe 3 is efficiently transmitted to the force detector 8.

In working the present invention, it is possible to suitably combine the above-mentioned embodiments. Further, the present invention is not limited to the embodiments mentioned above, i.e., various modifications of the above embodiments are possible.

While molten metal was used as an example of the liquid above, the liquid level detection apparatus of the present invention may of course be utilized for detection of the level of other high temperature liquids, naturally, and also ordinary liquids.

Another embodiment of the present invention will be explained below.

The above embodiments all related to a liquid level detection apparatus, but it is also possible to use the above construction of an apparatus and provide an apparatus for measuring the specific gravity.

The above equation (1) may he modified as follows:

$$\rho=\Delta F/\Delta S\cdot k \qquad (21)$$

Here, K is $(L1/L2)(*/4)D^2$ and is a constant.

Therefore, using this principle, by detecting the force $\Delta F$ applied to the force detector 8 when the probe 3 is inserted into the liquid by exactly a predetermined amount $\Delta S$, the specific gravity $\rho$ of the liquid can be calculated. The measurement of the depth of insertion $\Delta S$ is performed by the displacement sensor 24 used in the fourth embodiment, for example.

INDUSTRIAL APPLICABILITY

The liquid level detection apparatus of the present invention may be used for the detection of the level of various liquids and in particularly may be favorably used for the measurement of the level of high temperature liquids.

Further, the present invention also enables detection and measurement of the specific gravity of liquids.

We claim:

1. A liquid level detection apparatus, comprising:
    a probe having a first end inserted into liquid and a second end positioned outside of the liquid, and which first end is provided buoyancy in response to a level of said liquid;
    a fulcrum;
    an arm coupled to said fulcrum, having a fixed end affixed to said second end of said probe, and a free end opposite to said fixed end, and having a force applied to said free end through said fulcrum in response to the buoyancy of said probe;
    force detecting means, provided abutting said free end of said arm, for detecting a force applied to said free end of said arm; and
    signal processing means for inputting a detection signal from said force detecting means, suppressing a predetermined frequency component contained in said detection signal, and calculating an insertion depth of said probe into said liquid to determine said level of said liquid.

2. A liquid level detection apparatus as set forth in claim 1, wherein said signal processing means comprises filter means for removing a mechanical vibration component included in said detection signal.

3. A liquid level detection apparatus as set forth in claim 2, where said filter means comprises a low pass filter.

4. A liquid level detection apparatus as set forth in claim 2, wherein said signal processing means samples output detection signals of said force detecting means with a constant period, and calculates an average of said sampled output signals for several periods of a resonance frequency to suppress resonance noise.

5. A liquid level detection apparatus as set forth in claim 1, wherein said probe comprises a high temperature resistant material comprising a ceramic.

6. A liquid level detection apparatus, comprising:
    a probe having a first end inserted into liquid and a second end positioned outside of said liquid, and which first end is provided buoyancy in response to a level of said liquid;
    a fulcrum;
    an arm coupled to said fulcrum, having a fixed end affixed to said second end of said probe, and a free end opposite to said fixed end, and having a force applied to said free end through said fulcrum in response to the buoyancy of said probe;
    force detecting means, provided abutting said free end of said arm, for detecting a force applied to said free end of said arm;
    means for avoiding application of a horizontal component force to said force detecting means; and
    means for determining liquid level responsive to the detected force.

7. A liquid level detection apparatus as set forth in claim 6, wherein said arm is supported at a center of gravity of said arm.

8. A liquid level detection apparatus as set forth in claim 6, wherein said force detecting means comprises a load cell having a working point, and said means for avoiding the application of the horizontal component force comprises a bearing provided at the working point of said load cell, and said bearing contacts said free end of said arm.

9. A liquid level detection apparatus as set forth in claim 6, wherein said liquid level determining means further comprising a signal processor comprising filter means for removing a mechanical vibration component included in a detection signal produced by said force detecting means.

10. A liquid level detection apparatus as set forth in claim 9, where said filter means comprises a low pass filter.

11. A liquid level detection apparatus as set forth in claim 10, wherein said signal processor samples output detection signals of said force detecting means with a constant period, and calculates an average of said sampled output detection signals for several periods of a resonance frequency to suppress resonance noise.

12. A liquid level detection apparatus for a tank holding liquid, said apparatus comprising:
    a probe having a first end inserted into the liquid of the tank and a second end positioned outside of said liquid, and which first end is provided buoyancy in response to a level of said liquid;
    a fulcrum;
    an arm coupled to said fulcrum, having a fixed end affixed to said second end of said probe, and a free end opposite to said fixed end, and having a force applied to said free end through said fulcrum in response to the buoyancy of said probe;
    force detecting means, provided abutting said free end of said arm, for detecting a force applied to said free end of said arm;
    means, provided in the tank and allowing free movement of said probe, for preventing a flow of said liquid from affecting said probe; and
    means for determining liquid level responsive to the detected force.

13. A liquid level detecting apparatus as set forth in claim 12, wherein said means for preventing comprises means for avoiding application of a horizontal component force to said probe.

14. A liquid level detection apparatus as set forth in claim 13, wherein said arm is supported at a center of gravity of said arm.

15. A liquid level detection apparatus as set forth in claim 13, wherein said force detecting means comprises a load cell having a working point, and said means for avoiding the application of the horizontal component force comprises a bearing provided at the working point of said load cell, and said bearing contacts said free end of said arm.

16. A liquid level detection apparatus as set forth in claim 12, wherein said arm is formed in a crank shape, and the height of said fulcrum for said arm and the height of the level of said liquid substantially coincide.

17. A liquid level detection apparatus as set forth in claim 12, wherein said means for preventing comprises a shield pipe disposed around a bottom of said probe.

18. A liquid level detection apparatus as set forth in claim 12, further comprising:
    a supporting shaft supporting and perpendicularly attached to said arm and having an outer circumference; and a magnetic bearing apparatus comprising electromagnets disposed at predetermined positions on the outer circumference of said supporting shaft.

19. A liquid level detection apparatus as set forth in claim 12, wherein said liquid level determining means further comprising a signal processor comprising filter means for removing a mechanical vibration component included in a detection signal from said force detecting means.

20. A liquid level detection apparatus as set forth in claim 19, where said filter means comprises a low pass filter.

21. A liquid level detection apparatus as set forth in claim 19, wherein said signal processor samples output detection signals of said force detecting means with a constant period, and calculates an average of said sampled output detection signals for several periods of a resonance frequency to remove resonance noise.

22. A liquid level detection apparatus, comprising:
a probe having a first end inserted into liquid and a second end positioned outside of said liquid, and which first end is provided buoyancy in response to a level of said liquid;
a fulcrum;
an arm coupled to said fulcrum having a fixed end affixed to said second end of said probe, and a free end opposite to said fixed end, and having a force applied to said free end through said fulcrum in response to the buoyancy of said probe;
force detecting means, provided abutting said free end of said arm, for detecting a force applied to said free end of said arm;
a compensator, having a fixed end and a coefficient of heat expansion greater than that of said arm, placed in close contact along said arm, said arm and said fixed end of said compensator being affixed at said free end of said probe, and an opposite end of said compensator being a free end; and
means for determining liquid level responsive to the force.

23. A liquid level detection apparatus as set forth in claim 22, further comprising a weight attached to said free end of the said compensator.

24. A liquid level detection apparatus as set forth in claim 22, further comprising means for avoiding application of a horizontal component force to said force detecting means.

25. A liquid level detection apparatus as set forth in claim 24, wherein said arm is supported at a center of gravity of said arm.

26. A liquid level detection apparatus as set forth in claim 25, wherein said force detecting means comprises a load cell having a working point, and said means for avoiding the application of the horizontal component force comprises a bearing provided at the working point of said load cell and in contact with said free end of said arm.

27. A liquid level detection apparatus as set forth in claim 22, wherein said arm has a crank shape and a height of said fulcrum and a height of the level of said liquid substantially coincide.

28. A liquid level detection apparatus as set forth in claim 22, further comprising a shield pipe disposed around a bottom of said probe.

29. A liquid level detection apparatus as set forth in claim 22, further comprising:

a supporting shaft supporting said arm, having an outer circumference and perpendicularly attached to said arm; and
a magnetic bearing apparatus comprising electromagnets disposed at predetermined positions on the outer circumference of said supporting shaft.

30. A liquid level detection apparatus as set forth in claim 22, wherein said liquid level determining means further comprising a signal processor comprising filter means for removing a mechanical vibration component included in a detection signal from said force detecting means.

31. A liquid level detection signal apparatus as set forth in claim 30, where said filter means comprises a low pass filter.

32. A liquid level detection apparatus as set forth in claim 30, wherein said signal processor samples output detection signals of said force detecting means with a constant period, and calculates an average of said sampled output detection signals for several periods of a resonance frequency to suppress resonance noise.

33. A liquid level detection apparatus, comprising:
a probe having a first end inserted into liquid and a second end positioned outside of said liquid, and which first end is provided buoyancy in response to a level of said liquid;
a fulcrum;
an arm coupled to said fulcrum, having a fixed end affixed to said second end of said probe, and a free end opposite to said fixed end, and having a force applied to said free end through said fulcrum in response to the buoyancy of said probe;
force detecting means, provided abutting said free end of said arm, for detecting a force applied to said free end of said arm;
a carriage maintaining said arm in a horizontal state and allowing said probe, said arm, and said force detecting means to vertically move;
detecting means for measuring the vertical distance of said carriage; and
means for determining liquid level responsive to the force and the vertical distance.

34. A liquid level detection apparatus as set forth in claim 33, further comprising two clamps a top of said probe and being fastened by screws to affix said probe to said arm in a detachable manner.

35. A liquid level detection apparatus as set forth in claim 33, further comprising means for avoiding application of a horizontal component force to said force detecting means.

36. A liquid level detection apparatus as set forth in claim 35, wherein said arm is supported at a center of gravity of said arm.

37. A liquid level detection apparatus as set forth in claim 36, wherein said force detecting means comprises a load cell having a working point, and said means for avoiding the application of the horizontal component force comprises a bearing provided at the working point of said load cell, and said bearing contacts said free end of said arm.

38. A liquid level detection apparatus as set forth in claim 33, further comprising a shield pipe disposed around a bottom of said probe.

39. A liquid level detection apparatus as set forth in claim 33, further comprising:
a supporting staff supporting said arm, having an outer circumference and perpendicularly attached to said arm; and a magnetic bearing apparatus comprising electromagnets disposed at predetermined positions on the outer circumference of said supporting shaft.

40. A liquid level detection apparatus as set forth in claim 33, wherein said liquid level determining means further comprising a signal processor comprising filter means for removing a mechanical vibration component included in a detection signal from said force detecting signal.

41. A liquid level detection apparatus as set forth in claim 40, where said filter means comprises low pass filter.

42. A liquid level detection apparatus as set forth in claim 40, wherein said signal processor samples output detection signals of said force detecting means with a constant period, and calculates an average of said sampled output detection signals for several periods of a resonance frequency to suppress resonance noise.

43. A liquid level detection method, comprising the steps of:

inserting a free end of a probe, of which a fixed end is fixed to a first end of an arm which is arranged in a substantially horizontal direction, into liquid;

producing a buoyancy force signal due to buoyancy of said free end in said liquid, applied to said probe, at a second end of said arm opposite to said first end;

eliminating a predetermined frequency component included in the buoyancy force signal; and calculating an insertion depth of said probe into said liquid from said buoyancy force signal, to calculate a level of said liquid.

44. A liquid level detection method as set forth in claim 43 further comprising the steps of:

moving said probe up and down to vary the insertion depth of said probe into said liquid;

comparing a first buoyancy at a first movement position of said probe during said moving with a second buoyancy at a second movement position obtained by detecting the buoyancy at said second end of said arm; and automatically calibrating to compensate for parameters affecting calculation of the level of said liquid, based upon calibration coefficient which is obtained by a difference between said first movement position and said second movement position and a difference between said first buoyancy and said second buoyancy.

* * * * *

UNITED STATES PATENT AND TRADEMARK OFFICE
CERTIFICATE OF CORRECTION

PATENT NO. : 5,315,873
DATED : May 31, 1994
INVENTOR(S) : Jin

It is certified that error appears in the above-indentified patent and that said Letters Patent is hereby corrected as shown below:

Title Page, Col. 1, under [22] PCT Filed: "February 28, 1990" should be --February 28, 1991--.

Title Page, Col. 2, line 1, "61-144131" should be --61-114,131--.

* Title Page, Col. 2, under Abstract, line 7, delete "is".

* Title Page, Col. 2, under Abstract, line 16, "them" should be --then--.

Col. 2, line 62, delete "simple".

Col. 2, line 63, after the second occurrence of "a" insert --simple--.

* Col. 7, line 15, the first occurrence of "the" should be --The--.

Col. 8, line 21, should be new paragraph.

* Col. 8, line 45, ":" should be --.--.

* Col. 9, line 26, "th" should be --the--.

UNITED STATES PATENT AND TRADEMARK OFFICE
CERTIFICATE OF CORRECTION

PATENT NO. : 5,315,873  
DATED : May 31, 1994  
INVENTOR(S) : Jin

Page 2 of 3

It is certified that error appears in the above-indentified patent and that said Letters Patent is hereby corrected as shown below:

* Col. 10, line 11, "th" should be --the--.
Col. 10, line 14, "(rod)" should be --(rad)--.
Col. 10, line 14, "$\theta \approx \theta$" should be --$\theta \doteq \theta$--.
Col. 10, line 46, "θ" (all occurrences) should be --$\theta$--.
Col. 10, line 48, "θ" (all occurrences) should be --$\theta$--.
Col. 10, line 50, "θ" should be --$\theta$--.
Col. 10, line 52, "θ" should be --$\theta$--.
* Col. 12, line 8, "wad" should be --was--.
* Col. 12, line 15, after "connected" insert --by--.
Col. 14, line 68, delete "carriage".
Col. 17, line 1, "INDUSTRIAL APPLICABILITY" should be --Industrial Applicability--.
Col. 18, line 43, "detecting" should be --detection--.

UNITED STATES PATENT AND TRADEMARK OFFICE
CERTIFICATE OF CORRECTION

PATENT NO. : 5,315,873
DATED : May 31, 1994
INVENTOR(S) : Jin

It is certified that error appears in the above-indentified patent and that said Letters Patent is hereby corrected as shown below:

Col. 20, line 13, delete "signal".
    Col. 20, line 44, after "clamps" insert
        --clamping--.
    Col. 22, line 9, after "43" insert --,--.
\*   Col. 22, line 19, after "upon" insert --a--.

Signed and Sealed this

Fourteenth Day of February, 1995

Attest:

BRUCE LEHMAN

Attesting Officer        Commissioner of Patents and Trademarks